United States Patent
Wyss et al.

(10) Patent No.: US 8,995,813 B2
(45) Date of Patent: Mar. 31, 2015

(54) OPTICAL WAVEGUIDE ATTENUATOR FOR A POLARIZED LIGHT SOURCE

(71) Applicant: HOYA Corporation USA, Santa Clara, CA (US)

(72) Inventors: Rolf A. Wyss, Glendale, CA (US); Toshiaki Sonehara, Monrovia, CA (US)

(73) Assignee: HOYA Corporation USA, Santa Clara, CA (US)

( * ) Notice: Subject to any disclaimer, the term of this patent is extended or adjusted under 35 U.S.C. 154(b) by 215 days.

(21) Appl. No.: 13/680,050

(22) Filed: Nov. 17, 2012

(65) Prior Publication Data

US 2013/0315525 A1    Nov. 28, 2013

Related U.S. Application Data

(60) Provisional application No. 61/598,452, filed on Feb. 14, 2012.

(51) Int. Cl.
| | |
|---|---|
| G02B 6/02 | (2006.01) |
| G02B 6/10 | (2006.01) |
| G02B 6/036 | (2006.01) |
| G02B 6/27 | (2006.01) |

(52) U.S. Cl.
CPC ............ *G02B 6/105* (2013.01); *G02B 6/03694* (2013.01); *G02B 6/2726* (2013.01); *G02B 6/276* (2013.01)
USPC ............................. 385/140; 385/127; 385/131

(58) Field of Classification Search
CPC .................................................. G02B 6/03694
USPC .......................................................... 385/140
See application file for complete search history.

(56) References Cited

U.S. PATENT DOCUMENTS

| | | | |
|---|---|---|---|
| 4,359,260 | A | 11/1982 | Reinhart et al. |
| 5,572,618 | A | 11/1996 | DiGiovanni et al. |
| 6,181,465 | B1 | 1/2001 | Grubb et al. |
| 6,229,939 | B1 | 5/2001 | Komine |

(Continued)

FOREIGN PATENT DOCUMENTS

EP    0692722 A2    1/1996

OTHER PUBLICATIONS

International Search Report & Written Opinion dated Mar. 20, 2013 in co-owned counterpart App No. PCT/US2012/065723.

(Continued)

*Primary Examiner* — Jerry Rahll
(74) *Attorney, Agent, or Firm* — David S. Alavi

(57) ABSTRACT

An optical apparatus comprises: a waveguide substrate, optical cladding formed on the substrate; a waveguide core formed within the cladding, an optically absorptive layer formed within the cladding, and a linearly polarized light source. The waveguide core includes an attenuating segment thereof, and the absorptive layer is formed near the attenuating segment of the core. The core and cladding are arranged to form an optical waveguide that supports a propagating optical mode. The absorptive layer is positioned near the attenuating segment of the core so as to spatially overlap a portion of the optical mode. The extent of the overlap results in a designed level of optical loss per unit distance of propagation of a linearly polarized optical signal along the attenuating segment of the optical core in the optical mode without substantial alteration of the polarization state of the optical signal.

36 Claims, 11 Drawing Sheets

(56) References Cited

U.S. PATENT DOCUMENTS

| | | | |
|---|---|---|---|
| 6,891,983 B2 | 5/2005 | Hammer | |
| 7,376,327 B2 * | 5/2008 | Galstian et al. | 385/140 |
| 2006/0062518 A1 | 3/2006 | Galstian et al. | |
| 2006/0245707 A1 | 11/2006 | Engelberth et al. | |
| 2009/0067797 A1 | 3/2009 | Peale | |

OTHER PUBLICATIONS

Suematsu et al; "Fundamental transverse electric field (TE0) mode selection for thin-film asymmetric light guides"; Appl Phys Lett, vol. 21 No. 6 p. 291 (1972).

Yamamoto et al; "Charactersitics of Optical Guided Modes in . . . "; IEEE J Quantum Electron, vol. QE-11 No. 9 p. 729 (1975).

* cited by examiner

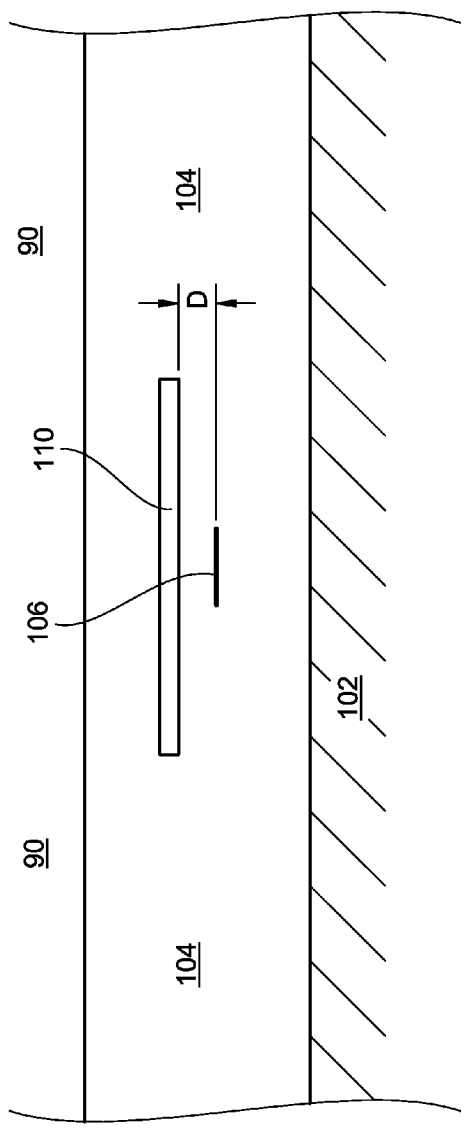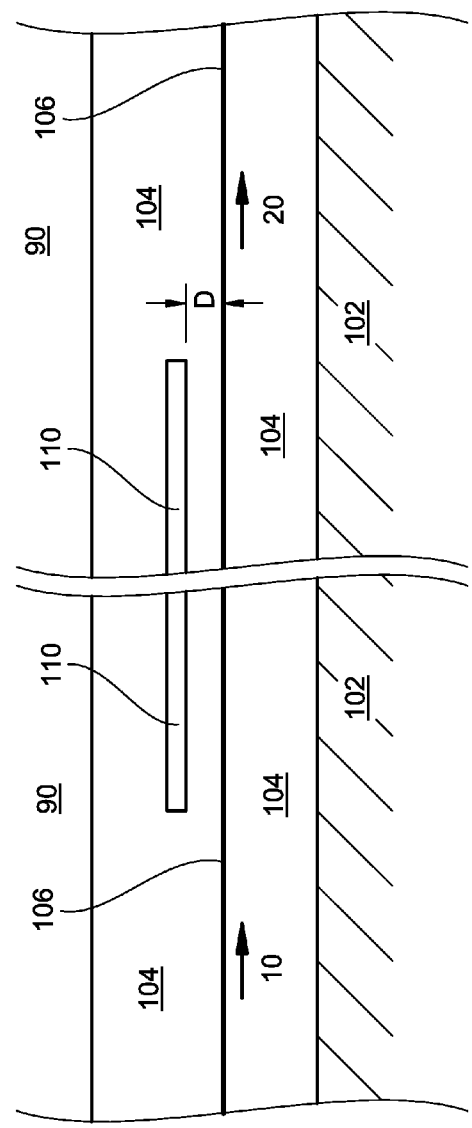

OPTICAL WAVEGUIDE ATTENUATOR FOR A POLARIZED LIGHT SOURCE

BENEFIT CLAIMS TO RELATED APPLICATIONS

This application claims benefit of U.S. provisional App. No. 61/598,452 filed Feb. 14, 2012 in the names of Rolf A. Wyss and Toshiaki Sonehara, said provisional application being hereby incorporated by reference as if fully set forth herein.

BACKGROUND

The field of the present disclosure relates to optical devices that include a light source launching an optical signal to propagate along an optical waveguide. In particular, apparatus and methods are described herein that employ an optical absorber near an optical waveguide on a waveguide substrate for attenuating linearly polarized output of a light source.

A common configuration for an optoelectronic device includes a substrate on which are formed one or more optical waveguides, and at least one light source positioned (perhaps mounted on the substrate) to launch at least a portion of its optical output signal to propagate along one or more of the optical waveguides on the substrate. The optical signal thus launched propagates along the optical waveguide in a corresponding guided optical mode that is substantially confined in two transverse dimensions.

In many instances, a standard light source (e.g., a laser diode) is incorporated into the assembled optoelectronic device; the standard light source might be manufactured by the same manufacturer that assembles the optoelectronic device, or might be obtained from a different manufacturer of merchant or OEM light sources. In some cases, the optimum operating output power of the standard laser diode is larger than the maximum optical signal power permitted in or desired from the optoelectronic device (e.g., to achieve desired a product specification or to comply with an established industry standard). Operating the laser diode at reduced output power, by reducing the drive current to a level that is not sufficiently above its lasing threshold current, can reduce the maximum speed or frequency at which the laser output can be modulated, or can reduce the risetime or introduce timing jitter at the leading edge of a modulated waveform. Operating at reduced current might also introduce spectral changes, power fluctuations, or other undesirable fluctuations or instabilities, or might require more precise control of DC laser bias current or modulation current amplitude to maintain a fixed extinction ratio.

Redesigning the laser diode to run optimally at lower output power, or re-sourcing a merchant laser diode to replace it with a different one that operates at lower output power, can incur significant costs, risks, or penalties, both technical and commercial. A more straightforward approach might include intentional introduction of an optical loss element into the optical waveguide, to reduce the power level of the propagating optical signal after it leaves the laser diode. In that way the standard laser diode or other light source can be operated at its optimal power level, but only a desired fraction of that output power propagates beyond the optical loss element.

SUMMARY

An optical apparatus comprises: a waveguide substrate, optical cladding formed on the substrate; a waveguide core formed within the cladding, an optically absorptive layer formed within the cladding, and a linearly polarized light source. The waveguide core includes an attenuating segment thereof, and the absorptive layer is formed near the attenuating segment of the core. The core and cladding are arranged to form an optical waveguide that supports a propagating optical mode. The absorptive layer comprises a discrete, substantially continuous metal layer distinct from the core and cladding. The absorptive layer is positioned near the attenuating segment of the core so as to spatially overlap a portion of the optical mode. The extent of the overlap results in a designed level of optical loss per unit distance of propagation of a linearly polarized optical signal along the attenuating segment of the optical core in the optical mode without substantial alteration of the polarization state of the optical signal.

Objects and advantages pertaining to attenuating a linearly polarized optical signal propagating in a waveguide using an optical absorber may become apparent upon referring to the exemplary embodiments illustrated in the drawings and disclosed in the following written description or appended claims.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 4 and 5 are schematic transverse and longitudinal cross-sectional views, respectively, of an exemplary optical waveguide that includes an optically absorptive layer comprising a discrete, substantially continuous layer distinct from the core and cladding.

Figure 1:
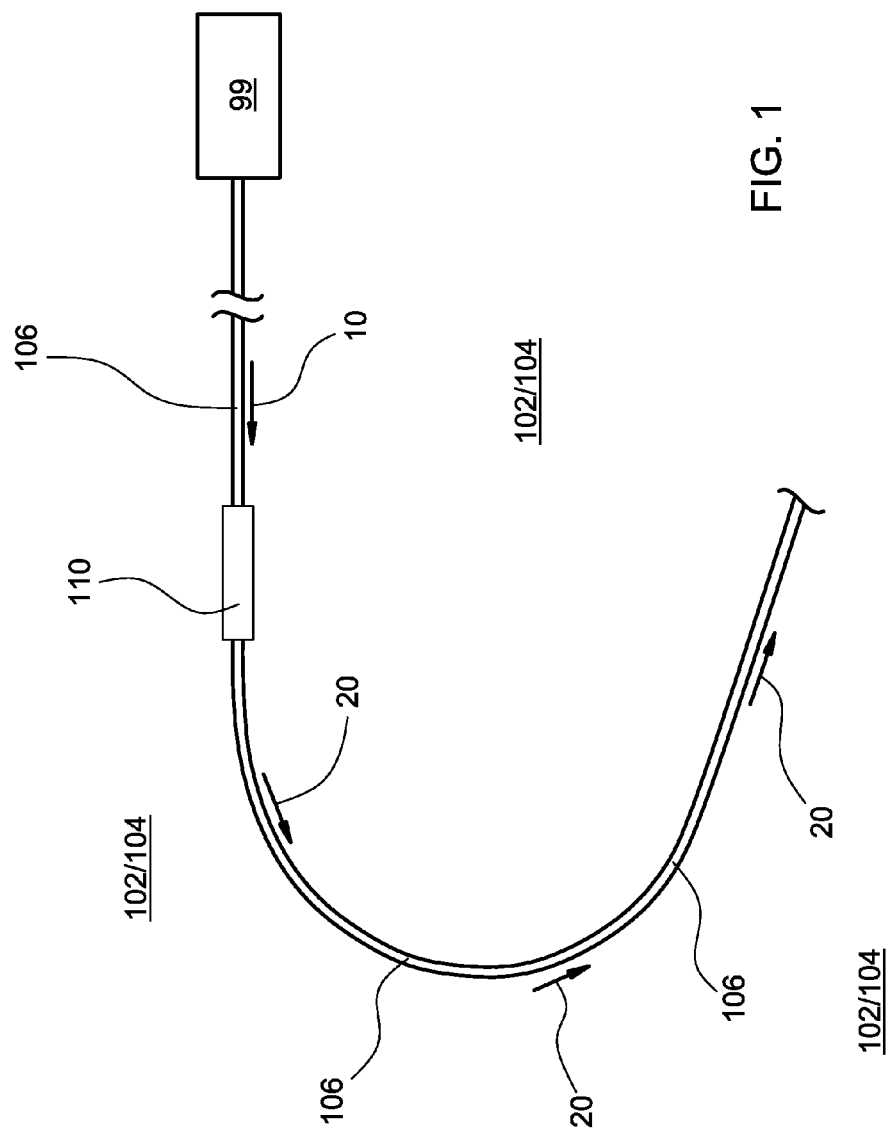
FIGS. 1 through 3 are schematic top views of an optical device including a light source, an optical waveguide, and an optically absorptive layer.

The embodiments depicted in this disclosure are shown only schematically, and not all features may be shown in full detail or in proper proportion. Certain features or structures may be exaggerated relative to others for clarity. Descriptors such as vertical, horizontal, above, below, lateral, and so forth are defined relative to the plane of a waveguide substrate, which is regarded as being horizontal and positioned below the core and cladding. The drawings should not be regarded as being to scale. The embodiments shown are exemplary only, and should not be construed as limiting the scope of the written description or appended claims.

DETAILED DESCRIPTION OF EMBODIMENTS

As noted above, it may be desirable in some optoelectronic devices (i) to employ a light source that, when operated in its optimal output power range, delivers more optical signal power than is permitted or desired in or from the optoelectronic device, and (ii) to intentionally introduce loss into an optical waveguide on a waveguide substrate so as to reduce the optical signal power to a desired or permitted level while still operating the light source in its optimal range. In the exemplary embodiments of the present disclosure, an optical loss element in the optical waveguide carrying the optical signal comprises an optically absorptive metal film positioned so as to attenuate an optical signal propagating along the optical waveguide.

Optical waveguides typically are formed in one or more layers of suitable core or cladding materials that are grown, deposited, or otherwise formed on the substrate; those layers can be referred to collectively as optical waveguide layers. The waveguide substrate acts as a structural support for the optical waveguide layers. While the waveguides are formed, strictly speaking, in the optical waveguide layers, they may also be referred to herein (equivalently if somewhat less precisely) as being formed on the waveguide substrate. The light source can be mounted on the waveguide substrate, directly or on one or more of the optical waveguide layers, and can be configured and positioned in any suitable way for launching at least a portion of its optical output signal into one of the waveguides formed in the optical waveguide layers. Alternatively, the light source can be located elsewhere (i.e., not mounted on the substrate) and at least a portion of its optical output signal can be conveyed by any suitable optical arrangement (e.g., using a lens) to be launched to propagate along optical source waveguide 40. Spatially selective processing of one or more of the optical waveguide layers (by deposition, removal, or alteration of material) defines the optical waveguides; those processed layers (or processed regions of those layers) can in some cases act as waveguide cores having a refractive index somewhat higher than surrounding layers, with those surrounding layers acting as waveguide cladding. A typical waveguide substrate can include regions having only cladding layers and other regions having one or more core layers in addition to cladding layers. In some examples of waveguides formed on substrates (e.g., co-owned U.S. Pat. Nos. 6,975,798; 7,136,564; 7,164,838; 7,184,643; 7,373,067; 7,394,954; 7,397,995; or 7,646,957, or co-owned Pub. No. 2010/0092144, each of which is incorporated by reference as if fully set forth herein), distinct regions can have differing numbers of core or cladding layers present, with the waveguide typically being defined by those regions where certain sets of core layers are present.

Figure 2:
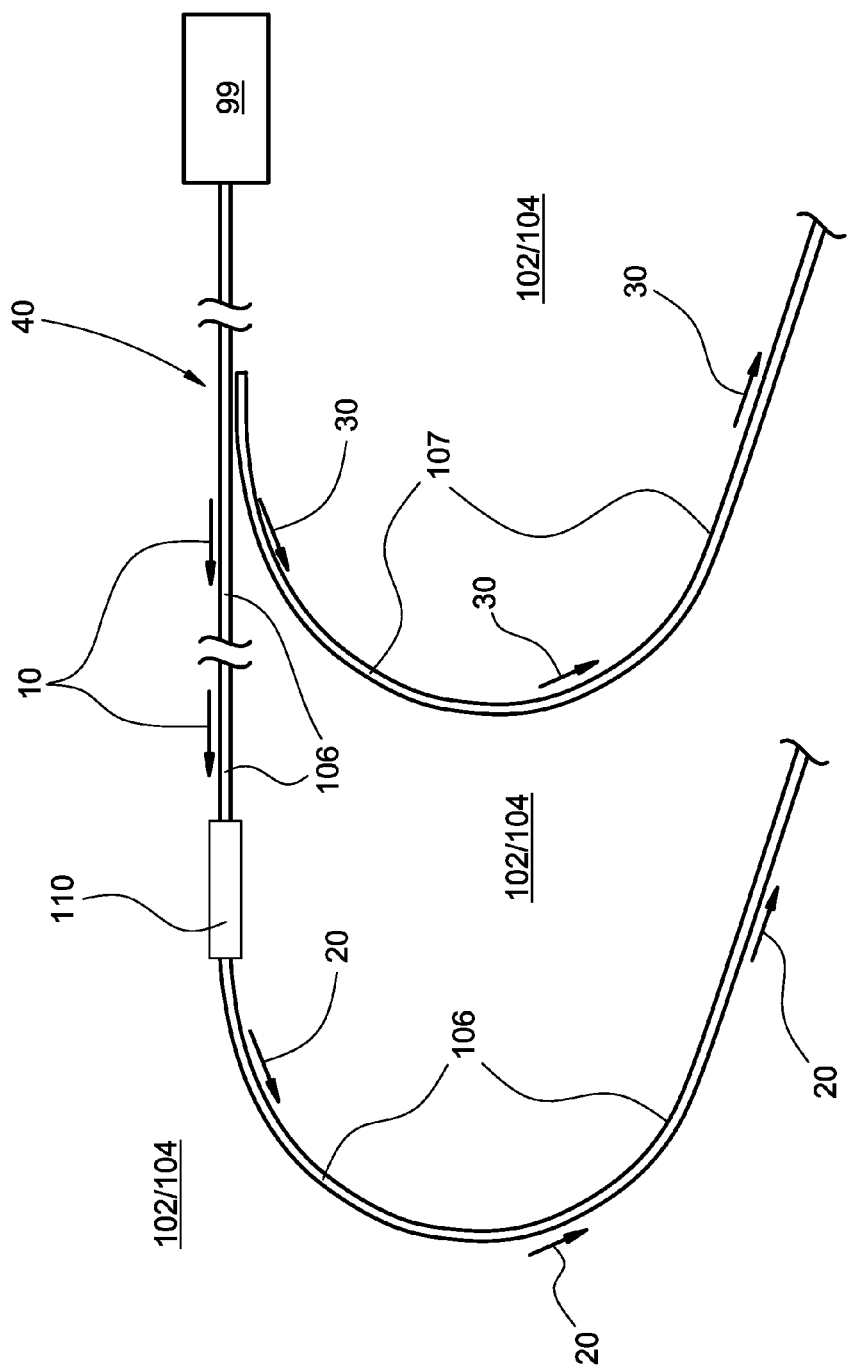
Figure 3:
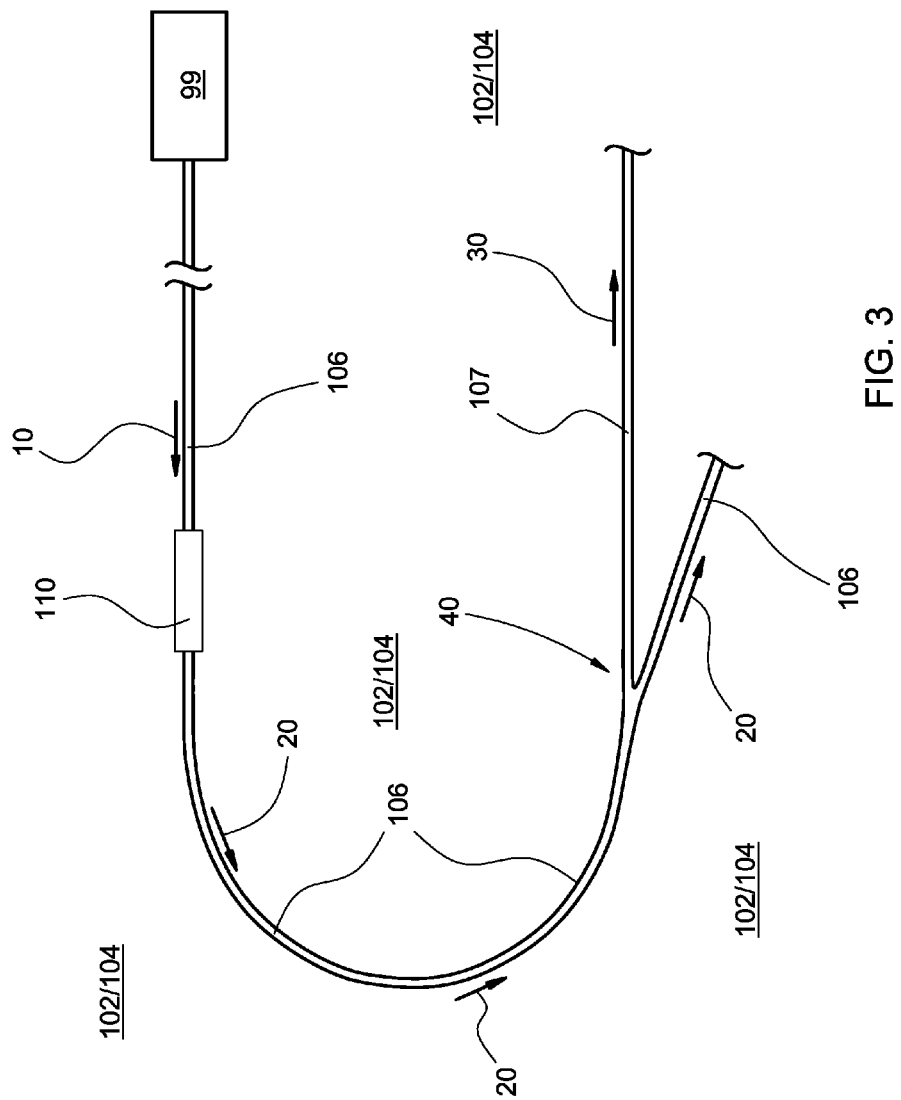
Figure 6:
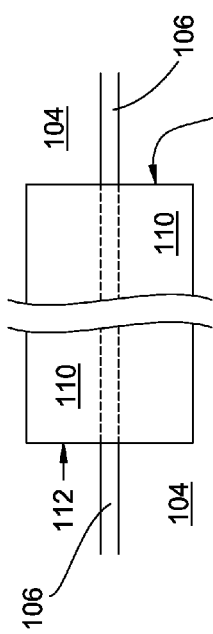
FIGS. 6 through 10 are schematic top views of various exemplary arrangements of a discrete, substantially continuous, optically absorptive layer near a waveguide core.
Figure 7:
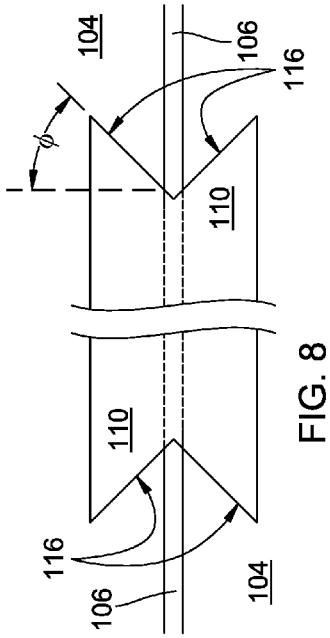
Figure 8:
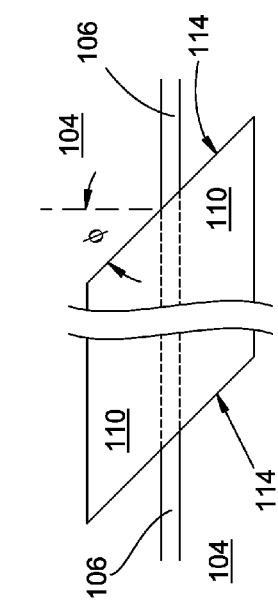

FIGS. 1 through 3 illustrate schematically several examples of optical devices that include a light source 99 and an optical waveguide on a substrate 102. The optical waveguide is defined by a waveguide core 106 within cladding 104. A single core 106 is shown within a single cladding material or layer 104 in the illustrated example, however, any suitable core or cladding configuration, including any of those disclosed in the references incorporated in the preceding paragraph, can be employed within the scope of the present disclosure. A discrete, substantially continuous optically absorptive layer 110 distinct from the core 106 and the cladding 104 is shown positioned near a portion of the waveguide core 106 to act as an optically absorptive waveguide attenuator. At least a portion of linearly polarized output from light source 99 (e.g., a laser diode of any suitable type) propagates as optical signal 10 along waveguide 106 toward the attenuator 110. Attenuated optical signal 20 propagates along waveguide 106 beyond the attenuator 110 in the same direction as optical signal 10 and in substantially the same linear polarization state. Variations shown in FIGS. 2 and 3 include a coupler or splitter 40 arranged to split off an optical signal 30 to propagate along waveguide 107, either from optical signal 10 before the attenuator 110 (as in FIG. 2) or from attenuated optical signal 20 after the attenuator 110 (as in FIG. 3). The optical signal 30 can be used for any suitable purpose, e.g., as a monitor signal for feedback control of the light source 99. The optical device can include other suitable arrangements of additional waveguides, optical splitters or couplers, and so forth while remaining within the scope of the present disclosure or appended claims.

Transverse and longitudinal cross-sections of the optical waveguide and optically absorptive waveguide attenuator are illustrated schematically in FIGS. 4 and 5. An optical waveguide comprises a waveguide core 106 formed within waveguide cladding 104, all of which are positioned on a waveguide substrate 102. Core 106 can comprise a single material, a single layer, multiple materials, or multiple layers (contiguous or otherwise); likewise, cladding 104 can comprise a single material, a single layer, multiple materials, or multiple layers (contiguous or otherwise). Entering and exiting optical signals 10 and 20, respectively, propagate along the waveguide in an optical mode supported by the waveguide core 106. Such a supported optical mode extends transversely beyond the transverse dimensions of the waveguide core 106. The cladding 104 above and below the core 106 typically is sufficiently thick so as to substantially prevent loss of a portion of the optical signals 10 and 20 into the substrate 102 or out of the top surface of the cladding 104. Put another way, the cladding 104 is sufficiently thick so as to substantially prevent significant spatial overlap of the supported optical mode with the substrate 102 below the cladding 104 or with an ambient medium 90 in contact with the top surface of the cladding 104.

In one specific example, the core 106 comprises silicon nitride ($n_{core} \approx 1.9$-$2.1$) about 2.5 μm wide and about 85 nm thick within silica or doped silica cladding ($n_{clad} \approx 1.44$-$1.48$); the substrate 102 comprises silicon. The cladding 104 is greater than, e.g., about 6 to 8 μm thick above and below the core 106; the cladding thickness is not critical provided it is sufficiently large (as discussed above). Any of a wide array of suitable core and cladding materials can be employed (e.g., silicon nitride or silicon oxynitride, silica or doped silica, various optical glasses), on any suitable substrate material (e.g., silicon or other semiconductor, fused silica or crystalline quartz, various glassy, crystalline, or ceramic materials), in any of a wide range of suitable spatial dimensions, for forming an optical waveguide. An optically absorptive waveguide attenuator can be advantageously employed with a waveguide arranged according to the preceding example, or can be implemented according to the present disclosure with other suitable waveguides regardless of the specific materials, structure, or dimensions employed for the waveguide core and cladding.

An optically absorptive waveguide attenuator comprises an a discrete, substantially continuous optically absorptive layer 110 distinct from the core 106 and the cladding 104 formed within the cladding 104 near a segment of the waveguide core 106 (referred to as an attenuating segment of the core 106). The absorptive layer 110 is displaced vertically from the waveguide core 106. The absorptive layer 110 can be formed either above or below the core 106, or absorptive layers 110 can be formed both above and below the core 106. Without loss of generality, examples are disclosed herein having a single absorptive layer 110 formed above the attenuating segment of the waveguide core 106. The absorptive layer 110 preferably extends bilaterally substantially beyond the lateral extent of a propagating optical mode supported by the waveguide core 106; the core 106 substantially confines the supported optical mode bilaterally. By virtue of the width of absorptive layer 110 substantially exceeding the width of the supported optical mode, the optical loss provided by the absorptive layer 110 is relatively insensitive to device-to-device variations in its width or lateral position that can arise during manufacturing.

The absorptive layer 110 typically comprises a metal layer, i.e., a layer wherein the metal is in its nonionic, electrically conductive, metallic state and not in an ionic state (e.g., as a dopant or salt) or in a compound with a nonmetal (e.g., as a metal oxide). Examples of suitable metal layers can include, e.g., a refractory metal, near-refractory metal, or an alloy thereof; refractory and near refractory metals are generally considered to include chromium, titanium, tungsten, molybdenum, niobium, tantalum, rhenium, vanadium, zirconium, hafnium, ruthenium, osmium, and iridium. Any suitable optically absorptive metal or alloy can be employed; in other embodiments, any suitable non-metallic absorptive material can be employed. Among criteria for optically absorptive material selection is compatibility with materials and processing conditions employed for forming the cladding 104 and core 106 on substrate 102 (e.g., good adherence to silica or doped silica, or stable under high temperature (e.g., above 900° C.) annealing).

Figure 11:
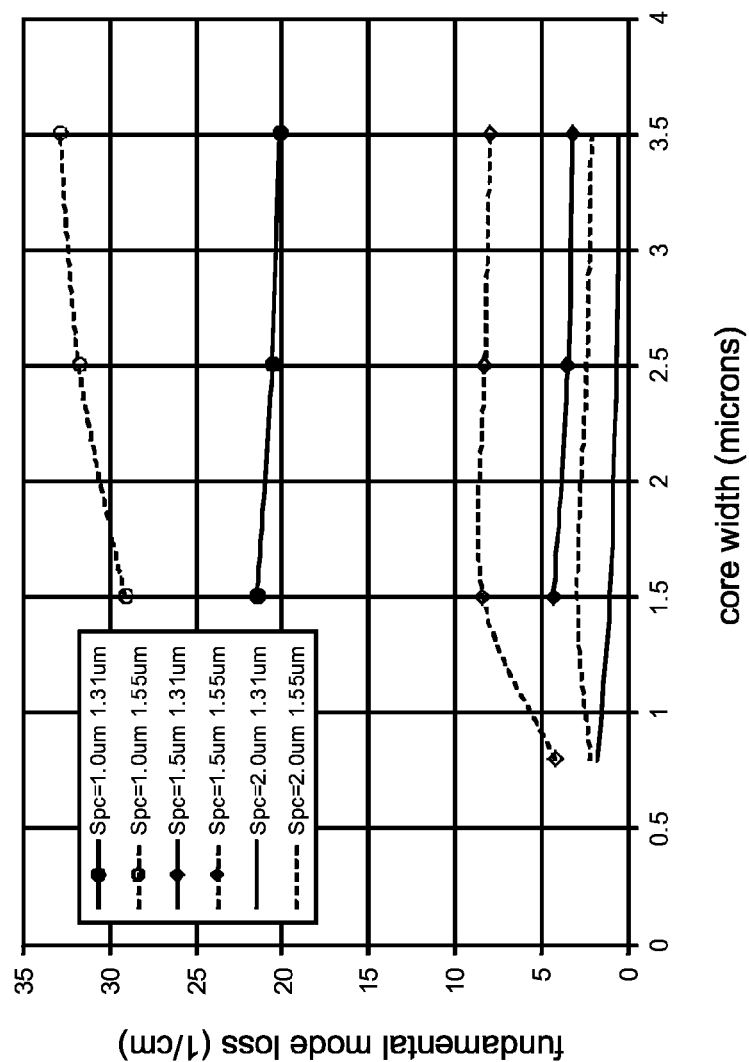
FIG. 11 is a plot of the mode loss coefficient α for a 10 μm wide metal attenuator layer calculated as a function of varying core width for several combinations of wavelength and spacer distance D (represented by "Spc").

The absorptive layer 110 is positioned at a desired vertical displacement distance D from the waveguide core 106. In the example given above, a silicon nitride core 85 nm thick by 2.5 µm wide within silica cladding 104 supports a propagating optical mode (λ between about 1.3 µm and about 1.6 µm) that is about 2.4 µm wide by about 1.2 µm high FWHM (full width at half maximum intensity). A discrete, substantially continuous metal layer (e.g., chromium, titanium, tungsten, or other suitable metal or alloy) about 10 µm wide and about 0.5 µm thick can be employed that is displaced from the core 106 by a displacement D that typically can vary from less than about 0.5 µm up to about 2 µm or more (for the exemplary waveguide geometry shown; other ranges for the displacement D can be suitable for other waveguide geometries). The relative widths of the absorptive layer 110 and the core 106 are not critical provided the width of the absorptive layer 110 substantially exceeds the lateral extent of the supported optical mode. That observation is illustrated by the results of an example calculation shown in FIG. 11, in which the mode loss coefficient α for a TE-polarized optical mode is calculated for a 10 µm wide chromium metal attenuator layer (using vertical dimensions and core and cladding materials given above) as a function of varying core width for several combinations of wavelength (1.31 µm and 1.55 µm) and spacer distance D (1.0 µm, 1.5 µm, and 2.0 µm); α varies relatively little with core width in that example. An absorptive layer 110 that does not exceed the optical mode in lateral extent can be employed, provided that the lateral position (relative to the core 106) and width of the absorptive layer 110 can be sufficiently well controlled during manufacture to provide a sufficiently reproducible level of optical attenuation. For many deposition and spatially selective processing techniques that might be employed for forming the optical waveguide and absorptive layer 110, it is typically the case that a given vertical displacement D can be achieved more precisely or reproducibly than a given width or lateral position of the absorptive layer 110.

Figure 12:
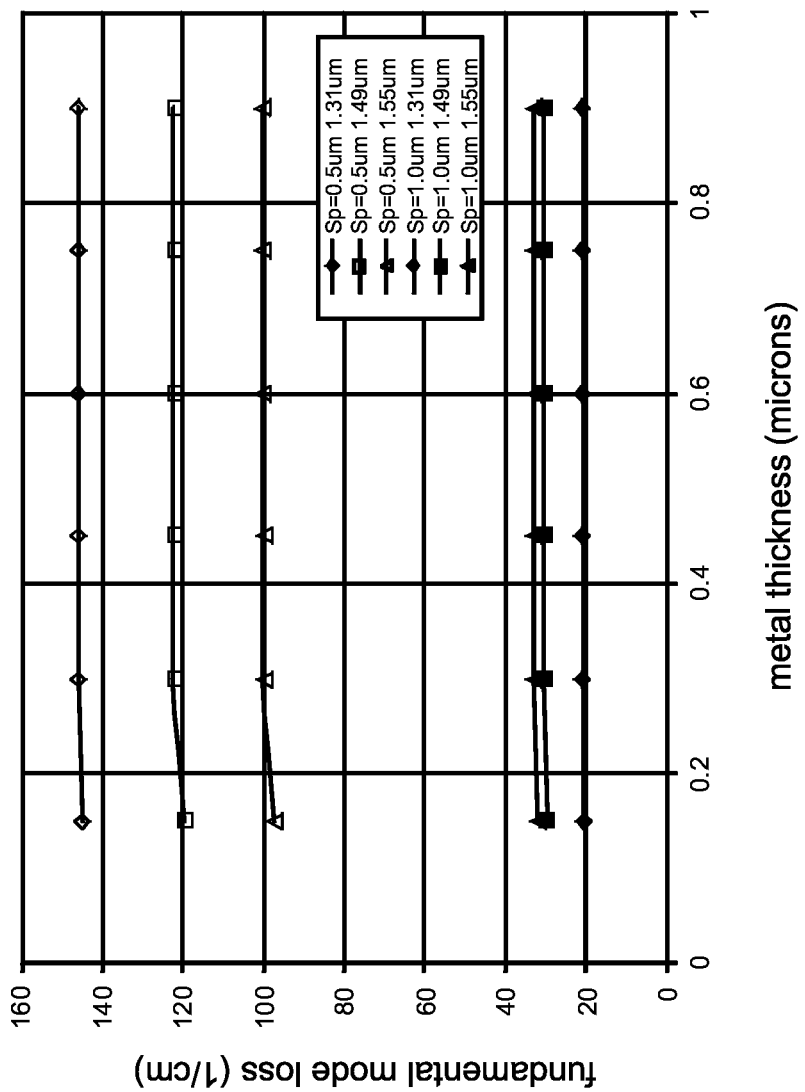
FIG. 12 is a plot of the mode loss coefficient α for a 10 μm wide metal attenuator layer calculated as a function of metal thickness for several combinations of wavelength and spacer distance D (represented by "Sp").

The thickness of the metal attenuator layer 110 also is not critical, as illustrated by the results of an example calculation shown in FIG. 12, in which the mode loss coefficient α for a TE-polarized optical mode is calculated for a 10 µm wide chromium metal attenuator layer (again, using vertical dimensions and core and cladding materials given above) as a function of metal thickness for several combinations of wavelength (1.31 µm, 1.49 µm, and 1.55 µm) and spacer distance D (0.5 µm and 1.0 µm). Once the absorptive metal layer 110 reaches a sufficient thickness (e.g., about 50 nm or about 100 nm), further increasing the thickness of the chromium metal layer does not substantially affect the attenuation of the optical signal; any convenient thickness of the absorptive metal layer 110 can be employed that meets or exceeds that sufficient thickness. One or more metal layers comprising one or more of various material compositions are frequently employed on a waveguide substrate for a variety of purposes, e.g., as conductive traces or as bonding or solder pads. It may be desirable to form such metallic structures and the absorptive metal layer 110 concurrently, using the same material composition and sequence of deposition and spatially selective processing steps. Whatever metal layer thickness is required for those other metallic structures can also be employed for the absorptive metal layer 110, as long as the sufficient thickness for that layer is met or exceeded.

Figure 13:
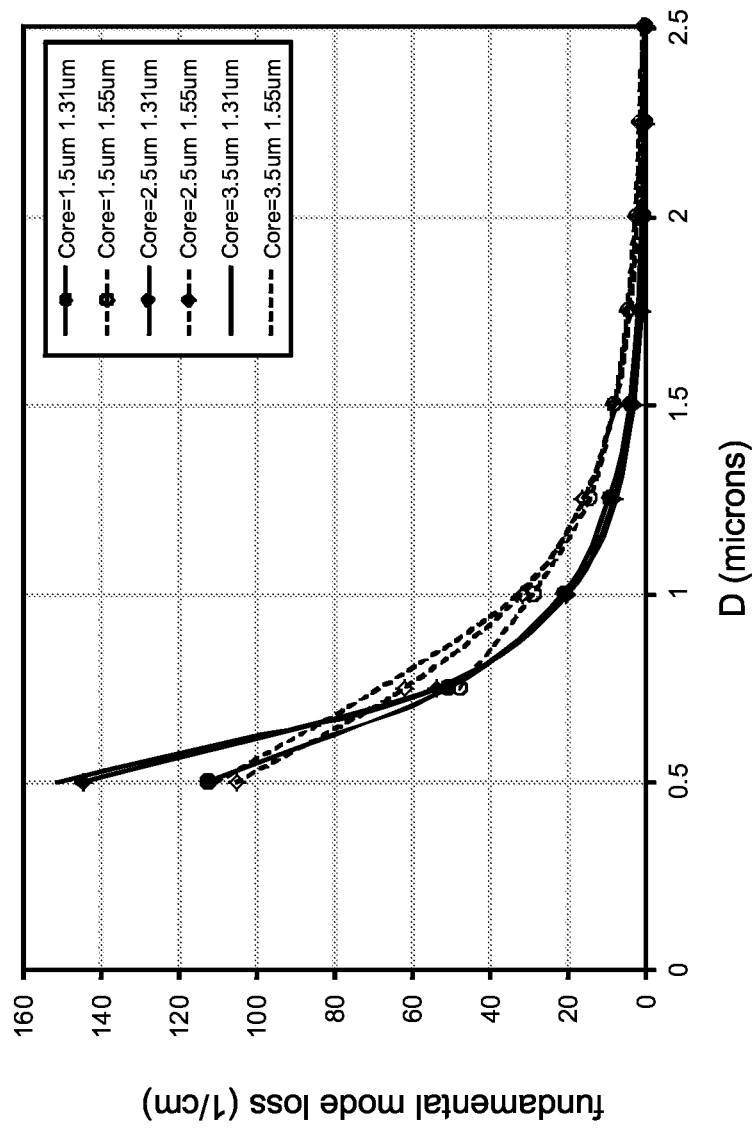
FIG. 13 is a plot of the mode loss coefficient α for a 10 μm wide metal attenuator layer calculated as a function of spacer distance D for several combinations of wavelength and core width.
Figure 14B:
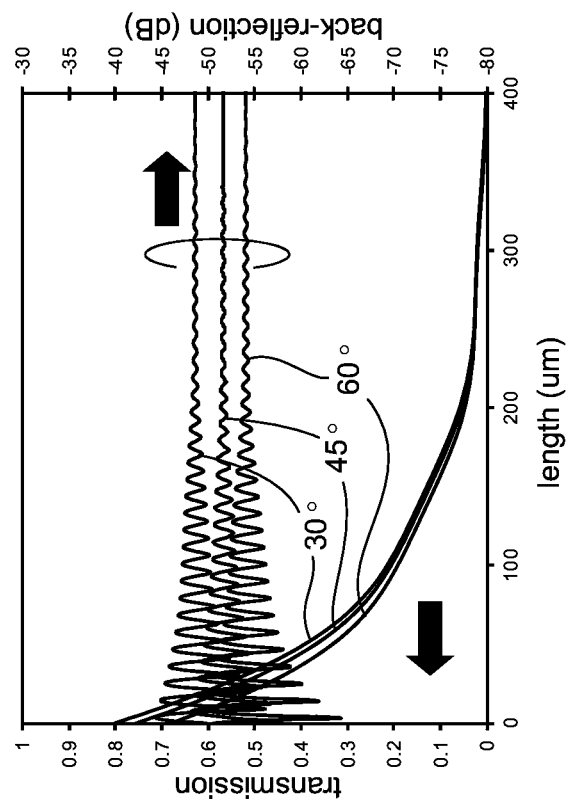
FIGS. 14A and 14B are plots of transmission and back-reflection as a function of attenuator entry angle φ and attenuator length, respectively, for a metal waveguide attenuator arranged as in FIG. 7.
Figure 14A:
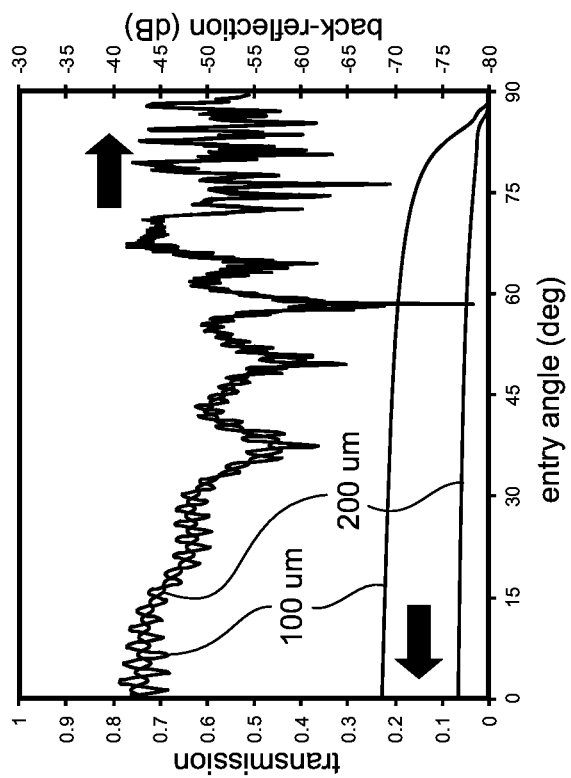
Figure 15A:
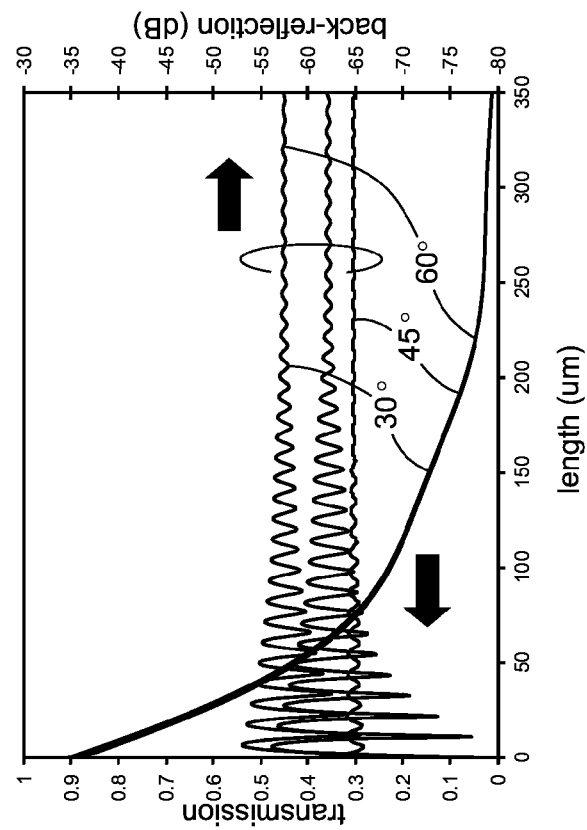
FIGS. 15A and 15B are plots of transmission and back-reflection as a function of attenuator entry angle φ and attenuator length, respectively, for a metal waveguide attenuator arranged as in FIG. 8.
Figure 15B:
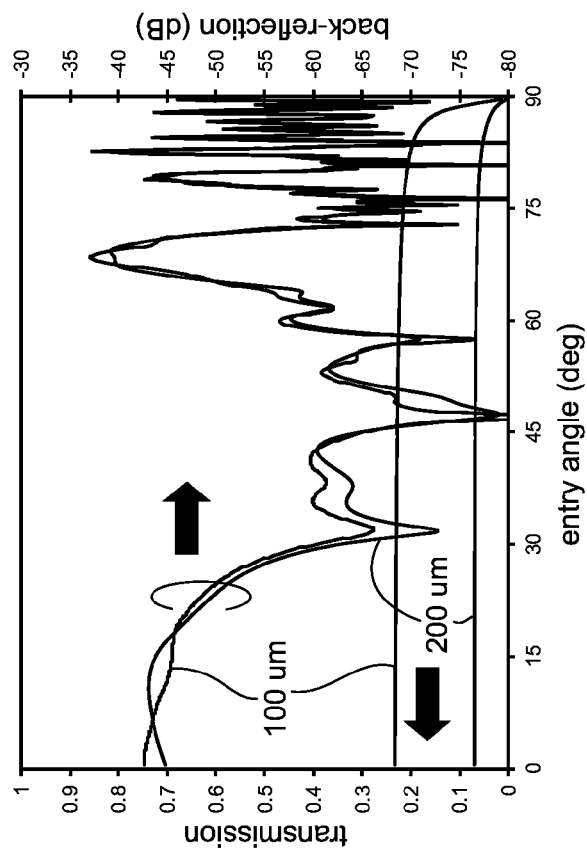
Figure 16B:
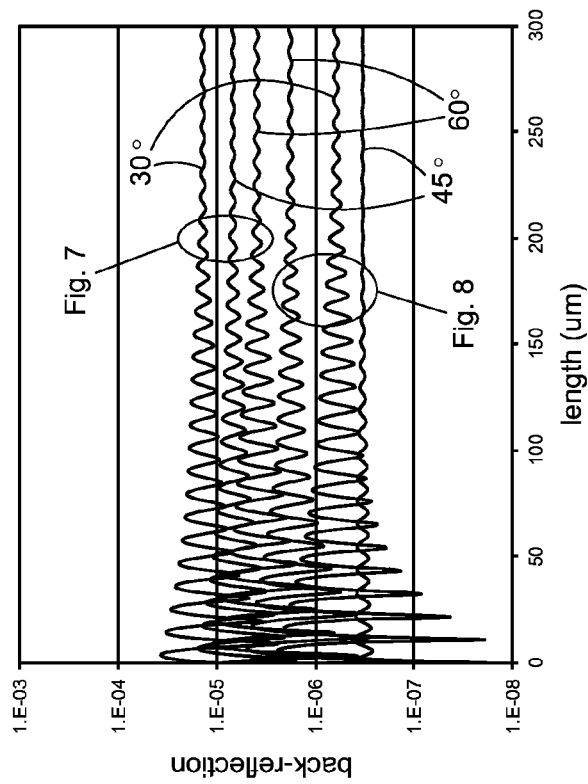
FIGS. 16A and 16B are plots of back-reflection as a function of attenuator entry angle φ and attenuator length, respectively, for a metal waveguide attenuators arranged as in FIGS. 7 and 8.
Figure 16A:
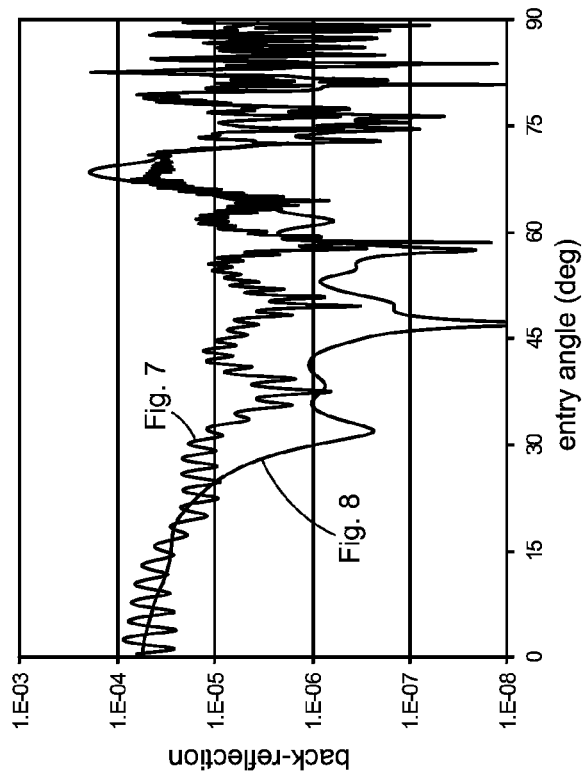

The optical loss per unit distance for the optical signal propagating along the optical waveguide (guided by the attenuating segment of the core 106) can be increased (decreased) by using a smaller (larger) distance D, as illustrated by the results of an example calculation shown in FIG. 13, in which the mode loss coefficient α for a TE-polarized optical mode is calculated for a 10 µm wide chromium metal attenuator layer (once again, using vertical dimensions and core and cladding materials given above) as a function of spacer distance D for several combinations of wavelength (1.31 µm and 1.55 µm) and core width (1.5 µm, 2.5 µm, and 3.5 µm). Experimental observations or numerical simulations can be employed to estimate or determine a suitable vertical displacement that yields a desired level of optical attenuation per unit distance along the attenuating segment of the core 106. Larger attenuation per unit distance enables a given level of overall attenuation by the waveguide attenuator to be implemented within a smaller space on the waveguide substrate 102, but might result in too much energy dissipation per unit area along the absorptive layer 110 (potentially causing thermal instabilities or damage). Smaller attenuation per unit distance enables greater total optical energy dissipation by the absorptive layer 110, but the length required to achieve a given overall level of attenuation might take up too much space on the waveguide substrate 102.

For any given combination of waveguide materials and geometry, a range of suitable absorptive layer lengths and vertical displacements can be employed to yield a desired optical loss per unit distance, and those suitable lengths or displacements shall fall within the scope of the present disclosure or appended claims. For the example waveguide discussed above (silicon nitride core within silica cladding), spacing D can be employed that is greater than about 0.3 µm, greater than about 0.5 µm, less than about 1 µm, or less than about 2 µm, yielding optical loss coefficients α from about 10 $cm^{-1}$ up to several hundred $cm^{-1}$ (wherein the fraction of the optical signal power transmitted past a length L of the waveguide attenuator is given by $\exp(-\alpha L)$). Those levels of optical loss yield overall attenuation of the optical signal between, e.g., about 50% and about 95% over lengths along the waveguide from about 10 µm long up to several hundred µm long.

Placement of a metal layer on or in the cladding near a core layer of a dielectric waveguide has been conventionally employed to provide differential transmission of optical signals having differing linear polarization states. See for example Yamamoto et al, *IEEE Journal of Quantum Electronics*, Vol. QE-11, page 729 (1975) or U.S. Pat. No. 4,359,260 (Bell Telephone Laboratories Inc.). In those and other examples, a metal layer displaced vertically from a dielectric waveguide core layer is observed to preferentially attenuate linearly polarized optical signals propagating in TM modes supported by the waveguide, relative to linearly polarized optical signals propagating in TE modes. An optimal spacing between the core and metal layers that maximizes that differential attenuation can be found that depends on the metal used, core dimensions, and the refractive indices of the core and cladding materials. Such conventional arrangements can be employed, e.g., to block one linear polarization state of an optical signal of random or unknown polarization state while permitting transmission of only optical signals having the orthogonal linear polarization state. In such optical waveguide polarizers it is often desired to maximize transmission of the transmitted polarization state, i.e., attenuation of that transmitted polarization state is undesirable and sought to be reduced, minimized, or avoided altogether.

In the optical devices disclosed or claimed herein, the optical signal 10 is emitted from the light source 99 in a known linear polarization state, typically propagating in one or more TE optical modes supported by the waveguide core 106 that are linearly polarized with the electric field substantially parallel to the substrate 102. The optical signal 10 propagates in the TE optical mode along waveguide core 106 toward the metal absorptive layer 110, and the attenuated optical signal 20 propagates in the TE optical mode along waveguide core 106 away from the metal absorptive layer 110. A novel use of the metal absorptive layer 110 comprises attenuation of an optical signal in a known linear polarization state to yield an attenuated optical signal in that same linear polarization state. The metal absorptive layer 110 provides the new and useful result of a substantially constant level of attenuation of the linearly polarized optical signal propagating along the waveguide, in contrast to conventional polarization-selective waveguides that employ a metal layer in which the level of attenuation varies according to the random or unknown polarization state of the input optical signal.

FIGS. 6 through 10 are top views that illustrate schematically several arrangements for the ends of the absorptive layer 110. Upon reaching the first end of the absorptive layer (more accurately, upon entering the attenuating segment of the core 106), a small fraction of the optical signal typically is reflected back along the waveguide. Similarly, upon reaching the second end of the absorptive layer 110 (i.e., upon exiting the attenuating segment of the core 106), a second small fraction of the optical signal can be back-reflected along the waveguide 106. Light back-reflected along the waveguide can be undesirable, e.g., resulting in undesirable optical feedback into the source of the entering optical signal 10. For the exemplary waveguide and absorptive layer discussed above, the total calculated back-reflection of the optical signal (from both ends of the absorptive layer 110) is between about −44 dB and about −49 dB for absorptive layer edges 112 substantially normal to the waveguide axis at the ends of the absorptive layer 110 (as in FIG. 6); interference effects can be observed with varying wavelength or absorptive layer length.

The amount of back-reflected light can be decreased by tilting the ends of the absorptive layer with respect to the optical axis of the optical waveguide. In one arrangement (FIG. 7), each end 114 of the absorptive layer 110 comprises a single substantially straight edge rotated by an angle $\phi$ away from an orientation that is normal to the optical axis; the two edges 114 are substantially parallel to one another. The back reflection decreases with increasing rotation of the absorptive layer edges 114 away from normal (e.g., less than about −50 dB or about less than about $10^{-5}$ between about 30° and about 60°, calculated for the exemplary waveguide and chromium absorptive layer discussed above; see FIGS. 14A, 14B, 16A, and 16B). Interference effects can be inferred from the oscillatory behavior exhibited in the plots of back-reflection versus length or entry angle $\phi$. An entry angle $\phi$ can be employed that minimizes the back reflection, or that merely reduces the back reflection to a sufficient degree, as needed or desired. Larger angles may or may not further decrease the back reflection, and may unduly increase the overall length of the absorptive layer 110. For differing waveguides (e.g., differing materials or geometry) or differing absorptive layers (e.g., differing materials or spacing D), the dependence of back reflection upon the angle $\phi$ may differ; a suitable angle $\phi$ can be estimated or determined experimentally or by numerical simulation.

In another arrangement of the optically absorptive layer 110 (FIG. 8), each end 116 of the absorptive layer 110 comprises a pair of substantially straight edges rotated in opposite directions by an angle $\phi$ away from an orientation that is normal to the optical axis of the waveguide; each pair forms a concave V-shaped edge at the corresponding end 116 of the absorptive layer 110. Rotation of the absorptive layer edges 116 away from normal decreases back reflection relative to the arrangements of FIGS. 6 and 7 (e.g., less than about −60 dB or less than about $10^{-6}$ between about 30° and about 60°, for the exemplary waveguide and chromium absorptive layer discussed above; see FIGS. 15A, 15B, 16A, and 16B). Both absolute value of the back-reflection and interference-related behaviors are reduced relative to the embodiments of FIGS. 6 and 7 (see FIGS. 16A and 16B), so that in some instances the arrangement of FIG. 8 for the metal attenuator layer 110 can be advantageously employed. An angle $\phi$ can be employed that minimizes the back reflection (calculated to be about 48° for this example), or that merely reduces the back reflection to a sufficient degree (perhaps over a desired range of wavelengths), as needed or desired. As noted above, larger angles may unduly increase the overall length of the absorptive layer 110. For differing waveguides (e.g., differing materials or geometry) or other absorptive layers (e.g., differing materials or spacing D), the dependence of back reflection upon the angle $\phi$ may differ; a suitable angle $\phi$ can be estimated or determined experimentally or by numerical simulation.

Figure 9:
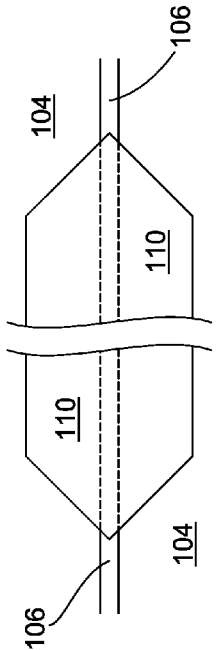
Figure 10:
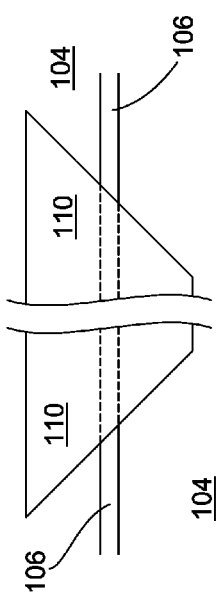

Other arrangements for the ends of the optically absorptive layer 110 are illustrated schematically in FIG. 9 (a single rotated edge at each end, which edges are not parallel to one another) and FIG. 10 (a pair of rotated edges at each end forming a convex V-shaped edge). Suitable angles for those arrangements can be estimated or determined experimentally or by numerical simulation. Angles $\phi$ can be employed that minimize the back reflection or that merely reduce the back reflection to a sufficient degree, as needed or desired.

In addition to the preceding, the following examples also fall within the scope of the present disclosure or appended claims:

EXAMPLE 1

An optical apparatus comprising: a waveguide substrate; optical cladding formed on the substrate; a waveguide core formed within the cladding, which waveguide core includes an attenuating segment thereof; an optically absorptive layer formed on or within the cladding near the attenuating segment of the core; and a light source, wherein: the core and cladding are arranged to form an optical waveguide that supports optical propagation in one or more optical modes; the light source is arranged to launch an optical signal to propagate in a given one of the optical modes in a known linear polarization state; the absorptive layer comprises a discrete, substantially continuous metal layer distinct from the core and the cladding; the absorptive layer is positioned near the attenuating segment of the core so as to spatially overlap a portion of the given optical mode to an extent so that the optical waveguide exhibits a designed level of optical loss per unit distance of propagation of the optical signal along the attenuating segment of the optical core in the given optical mode and in the known linear polarization state; and the optical waveguide and the absorptive layer are arranged so as to substantially avoid alteration of the linear polarization state of the optical signal as the optical signal propagates along the attenuating segment of the optical core.

EXAMPLE 2

The apparatus of claim 1 wherein the light source is positioned on the waveguide substrate or on one or more of the waveguide layers.

EXAMPLE 3

The apparatus of Example 1 or 2 wherein the known linear polarization state is a TE polarization state.

EXAMPLE 4

The apparatus of any one of Examples 1-3 wherein the known linear polarization state is polarized with an electric field substantially parallel to the waveguide substrate.

EXAMPLE 5

The apparatus of any one of Examples 1-4 wherein the core comprises silicon nitride or silicon oxynitride and the cladding comprises silica or doped silica.

EXAMPLE 6

The apparatus of any one of Examples 1-5 wherein the metal layer is greater than about 50 nm thick.

EXAMPLE 7

The apparatus of any one of Examples 1-6 wherein the metal layer comprises a refractory metal, a near-refractory metal, or an alloy thereof.

EXAMPLE 8

The apparatus of any one of Examples 1-7 wherein the metal layer comprises chromium, titanium, tungsten, molybdenum, or an alloy thereof.

EXAMPLE 9

The apparatus of any one of Examples 1-8 wherein the absorptive layer is positioned on or within the cladding vertically displaced above or below the core.

EXAMPLE 10

The apparatus of any one of Examples 1-9 wherein spacing between the core and the absorptive layer is greater than about 0.2 times, greater than about 0.4 times, less than about 2 times, or less than about 5 times a vertical size (FWHM) of the optical mode.

EXAMPLE 11

The apparatus of any one of Examples 1-10 wherein spacing between the core and the absorptive layer is greater than about 0.3 µm, greater than about 0.5 µm, less than about 1 µm, or less than about 2 µm.

EXAMPLE 12

The apparatus of any one of Examples 1-11 wherein the spacing between the core and the absorptive layer results in an optical loss coefficient α, for propagation of the optical signal in the optical mode along the attenuating segment, that is greater than about 10 $cm^{-1}$, greater than about 50 $cm^{-1}$, less than about 250 $cm^{-1}$, or less than about 300 $cm^{-1}$.

EXAMPLE 13

The apparatus of any one of Examples 1-12 wherein: the core comprises silicon nitride or oxynitride between about 1 and about 3 µm wide and between about 50 and about 200 µm thick; the cladding comprises silica or doped silica; the absorptive layer comprises a metal layer greater than about 50 nm thick; the metal layer comprises chromium, titanium, tungsten, or alloys thereof; the absorptive layer is positioned within the cladding vertically displaced above or below the core; spacing between the core and the absorptive layer is between about 0.3 µm and about 1 µm; and the attenuating segment is between about 10 µm and about 300 µm long.

EXAMPLE 14

The apparatus of any one of Examples 1-13 wherein overall optical loss of the optical signal, propagating past the attenuating segment in the optical mode, is between about 50% and about 95%.

EXAMPLE 15

The apparatus of any one of Examples 1-14 wherein each end of the absorptive layer comprises a single substantially straight edge oriented at a non-normal angle with respect to an optical axis of the optical waveguide.

EXAMPLE 16

The apparatus of Example 15 wherein the edges are substantially parallel to one another.

EXAMPLE 17

The apparatus of Example 16 wherein the edges are oriented at an angle displaced between about 30° and about 60° from normal incidence.

EXAMPLE 18

The apparatus of Example 16 wherein back-reflection along the waveguide from the absorptive layer is less than about $10^{-5}$.

EXAMPLE 19

The apparatus of any one of Examples 1-14 wherein each end of the absorptive layer comprises a pair of substantially straight edges oriented at a non-normal angle with respect to an optical axis of the optical waveguide.

EXAMPLE 20

The apparatus of Example 19 wherein each pair of edges forms a concave, V-shaped end of the absorptive layer.

EXAMPLE 21

The apparatus of Example 20 wherein the edges are oriented at an angle displaced between about 30° and about 60° from normal incidence.

EXAMPLE 22

The apparatus of Example 20 wherein back-reflection from the absorptive layer along the waveguide is less than about $10^{-6}$.

EXAMPLE 23

The apparatus of Example 19 wherein each pair of edges forms a convex, V-shaped end of the absorptive layer.

EXAMPLE 24

A method for making the apparatus of any preceding Example, the method comprising: forming the optical cladding on the waveguide substrate; forming the waveguide core within the cladding, including forming the attenuating segment thereof; forming the optically absorptive layer on or within the cladding near the attenuating segment of the core; and arranging the light source to launch an optical signal to propagate in a given one of the optical modes in a known linear polarization state.

EXAMPLE 25

A method for using the apparatus of any preceding Example, the method comprising: launching the optical signal from the light source to propagate in the known linear polarization state in one of the one or more optical mode supported by the optical waveguide on the waveguide substrate; and attenuating the optical signal by propagating the optical signal in the known linear polarization state past the attenuating segment of the optical waveguide.

It is intended that equivalents of the disclosed exemplary embodiments and methods shall fall within the scope of the present disclosure or appended claims. It is intended that the disclosed exemplary embodiments and methods, and equivalents thereof, may be modified while remaining within the scope of the present disclosure or appended claims.

In the foregoing Detailed Description, various features may be grouped together in several exemplary embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed exemplary embodiment. Thus, the appended claims are hereby incorporated into the Detailed Description, with each claim standing on its own as a separate disclosed embodiment. However, the present disclosure shall also be construed as implicitly disclosing any embodiment having any suitable set of one or more disclosed or claimed features (i.e., sets of features that are not incompatible or mutually exclusive), including sets of features that may not be explicitly disclosed together. It should be further noted that the scope of the appended claims do not necessarily encompass the whole of the subject matter disclosed herein.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes of the present disclosure or appended claims, the words "comprising," "including," "having," and variants thereof, wherever they appear, shall be construed as open ended terminology, with the same meaning as if the phrase "at least" or "but not limited to" were appended after each instance thereof.

In the appended claims, if the provisions of 35 USC §112 ¶ 6 are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC §112 ¶ 6 are not intended to be invoked for that claim.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

What is claimed is:

1. An optical apparatus comprising:
    a waveguide substrate;
    optical cladding formed on the substrate;
    a waveguide core formed within the cladding, which waveguide core includes an attenuating segment thereof;
    an optically absorptive layer formed on or within the cladding near the attenuating segment of the core; and
    a light source,
    wherein:
    the core and cladding are arranged to form an optical waveguide that supports optical propagation in one or more optical modes;

the light source is arranged to launch an optical signal to propagate in a given one of the optical modes in a known linear polarization state;

the absorptive layer comprises a discrete, substantially continuous metal layer distinct from the core and the cladding;

the absorptive layer is positioned near the attenuating segment of the core so as to spatially overlap a portion of the given optical mode to an extent so that the optical waveguide exhibits a designed level of optical loss per unit distance of propagation of the optical signal along the attenuating segment of the optical core in the given optical mode and in the known linear polarization state; and the optical waveguide and the absorptive layer are arranged so as to substantially avoid alteration of the linear polarization state of the optical signal as the optical signal propagates along the attenuating segment of the optical core.

2. The apparatus of claim 1 wherein each end of the absorptive layer comprises a single substantially straight edge oriented at a non-normal angle with respect to an optical axis of the optical waveguide.

3. The apparatus of claim 2 wherein the edges are substantially parallel to one another.

4. The apparatus of claim 3 wherein the edges are oriented at an angle displaced between about 30° and about 60° from normal incidence.

5. The apparatus of claim 3 wherein back-reflection along the waveguide from the absorptive layer is less than about $10^{-5}$.

6. The apparatus of claim 1 wherein each end of the absorptive layer comprises a pair of substantially straight edges oriented at a non-normal angle with respect to an optical axis of the optical waveguide.

7. The apparatus of claim 6 wherein each pair of edges forms a concave, V-shaped end of the absorptive layer.

8. The apparatus of claim 7 wherein the edges are oriented at an angle displaced between about 30° and about 60° from normal incidence.

9. The apparatus of claim 7 wherein back-reflection from the absorptive layer along the waveguide is less than about $10^{-6}$.

10. The apparatus of claim 6 wherein each pair of edges forms a convex, V-shaped end of the absorptive layer.

11. The apparatus of claim 1 wherein the light source is positioned on the waveguide substrate or on one or more of the waveguide layers.

12. The apparatus of claim 1 wherein the known linear polarization state is polarized with an electric field substantially parallel to the waveguide substrate.

13. The apparatus of claim 1 wherein the core comprises silicon nitride or silicon oxynitride and the cladding comprises silica or doped silica.

14. The apparatus of claim 1 wherein the metal layer is greater than about 50 nm thick.

15. The apparatus of claim 1 wherein the metal layer comprises a refractory metal, a near-refractory metal, or an alloy thereof.

16. The apparatus of claim 1 wherein the metal layer comprises chromium, titanium, tungsten, molybdenum, or an alloy thereof.

17. The apparatus of claim 1 wherein the absorptive layer is positioned on or within the cladding vertically displaced above or below the core.

18. The apparatus of claim 1 wherein spacing between the core and the absorptive layer is greater than about 0.2 times, greater than about 0.4 times, less than about 2 times, or less than about 5 times a vertical size (FWHM) of the optical mode.

19. The apparatus of claim 1 wherein spacing between the core and the absorptive layer is greater than about 0.3 µm, greater than about 0.5 µm, less than about 1 µm, or less than about 2 µm.

20. The apparatus of claim 1 wherein:

the core comprises silicon nitride or oxynitride between about 1 and about 3 µm wide and between about 50 and about 200 nm thick;

the cladding comprises silica or doped silica;

the metal layer is greater than about 50 nm thick;

the metal layer comprises chromium, titanium, tungsten, or alloys thereof;

the absorptive layer is positioned within the cladding vertically displaced above or below the core;

spacing between the core and the absorptive layer is between about 0.3 µm and about 1 µm; and the attenuating segment is between about 10 µm and about 300 µm long.

21. A method comprising:

forming optical cladding on a waveguide substrate;

forming a waveguide core within the cladding, which waveguide core includes an attenuating segment thereof;

forming an optically absorptive layer on or within the cladding near the attenuating segment of the core; and arranging a light source to launch an optical signal to propagate in a given one of the optical modes in a known linear polarization state, wherein:

the core and cladding are arranged to form an optical waveguide that supports optical propagation in one or more optical modes;

the absorptive layer comprises a discrete, substantially continuous metal layer distinct from the core and the cladding;

the absorptive layer is positioned near the attenuating segment of the core so as to spatially overlap a portion of the given optical mode to an extent so that the optical waveguide exhibits a designed level of optical loss per unit distance of propagation of the optical signal along the attenuating segment of the optical core in the given optical mode and in the known linear polarization state; and the optical waveguide and the absorptive layer are arranged so as to substantially avoid alteration of the linear polarization state of the optical signal as the optical signal propagates along the attenuating segment of the optical core.

22. The method of claim 21 wherein each end of the absorptive layer comprises a single substantially straight edge oriented at a non-normal angle with respect to an optical axis of the optical waveguide.

23. The method of claim 22 wherein the edges are substantially parallel to one another.

24. The method of claim 23 wherein back-reflection along the waveguide from the absorptive layer is less than about $10^{-5}$.

25. The method of claim 21 wherein each end of the absorptive layer comprises a pair of substantially straight edges oriented at a non-normal angle with respect to an optical axis of the optical waveguide.

26. The method of claim 25 wherein each pair of edges forms a concave, V-shaped end of the absorptive layer.

27. The method of claim 26 wherein back-reflection from the absorptive layer along the waveguide is less than about $10^{-6}$.

28. The method of claim 25 wherein each pair of edges forms a convex, V-shaped end of the absorptive layer.

29. A method comprising:
launching an optical signal from a light source to propagate in a known linear polarization state in an optical mode supported by an optical waveguide on a waveguide substrate; and
attenuating the optical signal by propagating the optical signal in the known linear polarization state past an attenuating segment of the optical waveguide,
wherein:
the optical waveguide comprises optical cladding formed on the waveguide substrate, a waveguide core formed within the cladding, which waveguide core includes an attenuating segment thereof, and an optically absorptive layer formed on or within the cladding near the attenuating segment of the core;
the absorptive layer comprises a discrete, substantially continuous metal layer distinct from the core and the cladding;
the absorptive layer is positioned near the attenuating segment of the core so as to spatially overlap a portion of the optical mode to an extent so that the optical waveguide exhibits a designed level of optical loss per unit distance of propagation of the optical signal along the attenuating segment of the optical core in the optical mode and in the known linear polarization state; and
the optical waveguide and the absorptive layer are arranged so as to substantially avoid alteration of the linear polarization state of the optical signal as the optical signal propagates along the attenuating segment of the optical core.

30. The method of claim 29 wherein each end of the absorptive layer comprises a single substantially straight edge oriented at a non-normal angle with respect to an optical axis of the optical waveguide.

31. The method of claim 30 wherein the edges are substantially parallel to one another.

32. The method of claim 31 wherein back-reflection along the waveguide from the absorptive layer is less than about $10^{-5}$.

33. The method of claim 29 wherein each end of the absorptive layer comprises a pair of substantially straight edges oriented at a non-normal angle with respect to an optical axis of the optical waveguide.

34. The method of claim 33 wherein each pair of edges forms a concave, V-shaped end of the absorptive layer.

35. The method of claim 34 wherein back-reflection from the absorptive layer along the waveguide is less than about $10^{-6}$.

36. The method of claim 33 wherein each pair of edges forms a convex, V-shaped end of the absorptive layer.

* * * * *